United States Patent
Shibuta

[11] Patent Number: 5,853,877
[45] Date of Patent: Dec. 29, 1998

[54] METHOD FOR DISENTANGLING HOLLOW CARBON MICROFIBERS, ELECTRICALLY CONDUCTIVE TRANSPARENT CARBON MICROFIBERS AGGREGATION FILM AMD COATING FOR FORMING SUCH FILM

[75] Inventor: Daisuke Shibuta, Omiya, Japan

[73] Assignees: Hyperion Catalysis International, Inc., Cambridge, Mass.; Mitsubishi Materials Corp. Tokyo, Chiyoda, Japan

[21] Appl. No.: 656,067

[22] Filed: May 31, 1996

[51] Int. Cl.⁶ .................................................. D02C 3/00
[52] U.S. Cl. ......................... 478/357; 428/367; 428/375
[58] Field of Search ................................ 428/357, 367, 428/375; 423/447.1, 447.2

[56] References Cited

U.S. PATENT DOCUMENTS

| | | | |
|---|---|---|---|
| 4,073,869 | 2/1978 | Kalin | 423/447.1 |
| 4,351,925 | 9/1982 | Warner | 525/369 |
| 4,685,940 | 8/1987 | Soffer et al. | 55/158 |
| 4,923,637 | 5/1990 | Yagi et al. | 252/511 |
| 5,288,304 | 2/1994 | Koros et al. | 95/45 |
| 5,458,784 | 10/1995 | Baker et al. | 210/674 |
| 5,599,380 | 2/1997 | Koros | 95/54 |
| 5,607,770 | 3/1997 | Lewis et al. | 428/408 |
| 5,626,650 | 5/1997 | Rodriquiz et al. | 95/116 |

FOREIGN PATENT DOCUMENTS 8012310A  1/1996  Japan.

*Primary Examiner*—Newton Edwards
*Attorney, Agent, or Firm*—Whitman Breed Abbott & Morgan, LLP; Barry Evans, Esq.; John E. Boyd, Esq.

[57] ABSTRACT

This invention relates to a method for disentangling hollow carbon microfibers and to the dispersion of hollow carbon microfibers, preferably having an outer diameter of 3.5 to 70 nm and an aspect ratio of at least 5, to form transparent electrically conductive films. Hollow carbon microfibers, treated with strong acids such as sulfuric acid or oleum and an oxidizing agent such as nitric acid, are disentangled and dispersed homogeneously in a polar solvent. The slurry in which the microfibers are suspended can be coated on a substrate. The coating film is dried and a transparent electrically conductive film is formed. A carbon microfiber aggregation film with excellent transparency is obtained having a total transmittance of at least 80 percent and a haze value of at most 0.1%.

20 Claims, 2 Drawing Sheets

METHOD FOR DISENTANGLING HOLLOW CARBON MICROFIBERS, ELECTRICALLY CONDUCTIVE TRANSPARENT CARBON MICROFIBERS AGGREGATION FILM AMD COATING FOR FORMING SUCH FILM

FIELD OF THE INVENTION

The present invention relates to a method for disentangling hollow carbon microfibers. The invention also relates to an electrically conductive transparent carbon microfiber aggregation film comprising such disentangled hollow carbon microfibers, an electrically transparent film comprising a binder and such hollow carbon microfibers and an electrically conductive transparent carbon microfibers aggregation film, and a coating composition for forming such film.

BACKGROUND OF THE INVENTION

An electrically conductive transparent film has conventionally been formed on an electrical insulating substrate by either of the following processes (1) or (2).
(1) a dry process such as PVD (including sputtering, ion plating and vacuum deposition) or CVD to form a conductive transparent film of a metal oxide type, e.g., tin-indium mixed oxide (ITO), antimony-tin mixed oxide (ATO), fluorine-doped tin oxide (FTO), aluminum-doped zinc oxide (FZO).
(2) a wet process using a conductive coating composition comprising an electrically conductive powder, e.g., one of the above-described mixed oxides and a binder.

The dry process (1) produces a film having both good transparency and good conductivity. However, it requires a complicated apparatus having a vacuum system and has poor productivity. Another problem of the dry process is that it is difficult to apply to a continuous or big substrate such as photographic films or show windows.

The wet process (2) requires a relatively simple apparatus, has high productivity, and is easy to apply to a continuous or big substrate. The electrically conductive powder used in the wet process is a very fine powder having an average primary particle diameter of 0.5 $\mu$m or less so as not to interfere with transparency of the resulting film. To obtain a transparent coating film, the conductive powder has an average primary particle diameter of half or less (0.2 $\mu$m) of the shortest wave of visible light so as not to absorb visible light, and to controlling scattering of the visible light.

However, the use of such a fine powder in the wet process (2) leads to strong cohesiveness between particles and tends to re-agglomerate in a coating composition, thereby causing the coating composition to have a low stability. Furthermore, since electrical conductivity results from direct contact between particles, it is necessary for electrically conductive powders to be present in a dry film in a large proportion (on the order of more than 50% by weight) in order to provide the film with adequate electrical conductivity. This increases the costs of a conductive film made by the wet process and leads to the loss of physical (mechanical and thermal) properties of the film.

Carbon fibers, particularly graphitized carbon fibers, have good electrical conductivity and have been used as conductive materials. Carbon fibers, prepared by the vapor-phase growth (pyrolysis) method and optionally subjected to graphitization by heat treatment, are particularly attractive since they are hollow or solid thin fibers having an outer diameter of 0.1–10 $\mu$m and have high electric conductivity. However, the blending of such thin carbon fibers with a resin to obtain electrical conductivity and coating the surface of a substrate leads to blackening of the product. For this reason, it is necessary to make the whole product black. Therefore, such carbon fibers and carbon fibers can not be used for transparent products.

Recently, carbon fibers much thinner than the fibers produced by the conventional vapor-phase growth method have been developed. See, Japanese Patent Publication Nos. 3-64606 and 3-77288; Japanese Unexamined Published Patent Application Nos. 1-131251, 3-174018 and 5-125619; and U.S. Pat. Nos. 4,663,230; 5,165,909; and 5,171,560, hereby incorporated by reference. Such very thin carbon fibers (hereinafter referred to as carbon micro fibers) are hollow fibers having a hollow core. Their outer diameter is in the range of several to several ten nanometers (nm). Due to their diameter on the order of nanometers, carbon microfibers are also called nanotubes or carbon fibrils. It has been proposed to use such fibers as a reinforcing material in the manufacture of composite materials, or to utilize their electrical conductivity and employ them in antistatic materials, electrodes, and in shields against electromagnetic waves.

U.S. Pat. No. 5,098,771 hereby incorporated by reference, describes an electrically conductive coating and ink containing hollow carbon microfibers. In order to give the coating electrical conductivity, the hollow microfibers disclosed in that patent are employed in an amount of 1–4 weight % with respect to a binder resin.

SUMMARY OF THE INVENTION

The present invention provides a transparent electrically conductive film which does not have the drawbacks of the prior films and a coating composition for forming this transparent electrically conductive film.

More concretely, the present invention relates to a transparent electrically conductive film formed by a coating composition which contains the above-described hollow carbon microfibers.

OBJECTS OF THE INVENTION

Accordingly, an object of the present invention is to provide a method for dispersing and disentangling hollow carbon microfibers in a polar solution after soaking hollow carbon microfibers in a strong acid containing sulfur in addition to an oxidizing agent.

Another object of the present invention is to provide electrically conductive transparent carbon microfibers aggregation film comprising hollow carbon microfibers treated with a strong acid containing sulfur in addition to an oxidizing agent.

A further object of the invention is to provide a coating composition for such film comprising hollow carbon microfibers suspended in a polar solution which are soaked in a strong acid containing sulfur in addition to an oxidizing agent.

A still further object of the present invention is to provide an electrically conductive transparent film comprising a binder and hollow carbon microfibers treated with a strong acid containing sulfur in addition to an oxidizing agent.

An even further object of this invention is to provide coating compositions for such a film comprising a binder and such hollow carbon microfibers suspended in a polar solvent which are soaked in a strong acid containing sulfur in addition to an oxidizing agent.

The foregoing and other objects and advantages of the invention will be set forth in or apparent from the following description.

DETAILED DESCRIPTION OF THE INVENTION

As mentioned above, in an composition containing carbon fibers as the electrically conductive material, blackening is unavoidable due to the color of the carbon fibers. The conductive powders used for transparent conductive film in the wet process (2) is generally a very fine metal oxide powder having an average primary particle diameter of 0.2 μm or less. Until this invention, it was not known that carbon fibers can be used for forming a transparent electrically conductive film.

Electrically conductive fibers can impart electrical conductivity to insulating materials in smaller amounts than electrically conductive powders. Taking notice of this respect, the present inventors applied the above-described hollow carbon microfibers as a conductive agent to form the transparent electrically conductive film.

Figure 1:
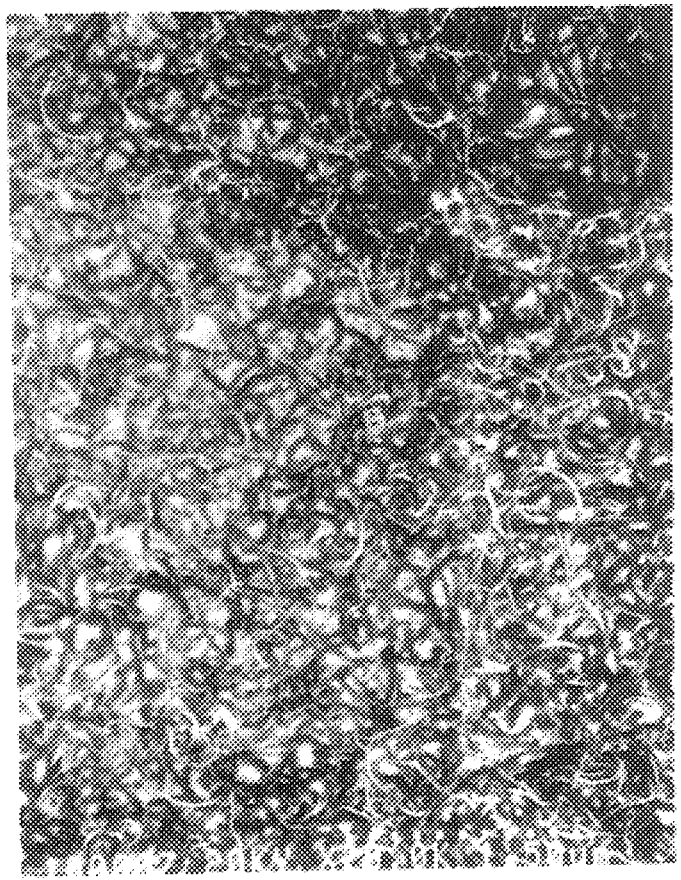
FIG. 1 is a transmission electron microscope (TEM) picture of entangled hollow carbon microfibers.

Ultra thin hollow carbon microfibers having an outer diameter of 100 nm or less, ought to have original transparency. However, this hollow carbon microfiber cannot give transparency to an electrically conductive film because of the strong black tones. Aggregation structures of this ultra microfiber cause bad transparency. That is to say, as shown in the TEM picture of hollow carbon microfibers of FIG. 1, carbon microfibers get entangled with one another to form a primary agglomeration. They further entangle to form a secondary agglomeration. It is difficult to separate these complicated entangled microfibers apart and the resulting composition is not transparent.

As a method of dispersing microfibers in a solution, mechanical dispersive technology (such as ball mill (bead mill) and roller mill) is applied. However, these mechanical processes do not disentangle the secondary aggregation of microfibers. Due to cutting of microfibers and re-agglomeration, it was not possible to disperse individual microfibers separately in a solution using these mechanical dispersive techniques.

Because of the agglomeration of microfibers, it was necessary to introduce a larger proportion of hollow carbon microfibers in order to provide a film with adequate electrical conductivity. This large amount of entangled microfibers leads to blackening or heterogeneous transparency of the electrically conductive film.

The present inventors, however, have discovered a process for disentangling intricate hollow carbon microfibers. Secondary agglomeration of microfibers can be homogeneously dispersed to a degree of an individual fiber by means of chemical treatment with a particular solution. Since such dispersed microfibers have self-cohesiveness, they combine with one another without using a binder. It is possible to form an electrically conductive film comprising substantially only hollow carbon microfibers. Such a conductive film has a black tone due to the carbon fibers, but good transparency due to a low existence per area of carbon fibers in the film.

The hollow carbon microfibers used as a conductive material are hollow carbon fibers obtained by a gaseous phase growth method having a fiber diameter of less than 100 nm (0.1 μm). More specifically, the present microfibers can be manufactured by means of bringing particles containing metal as a catalyst (e.g., alumina particles carried with Fe, Co, or Ni) in contact with a gas containing carbon under the temperature of about 850°–1200° C. The preferred present hollow carbon microfibers are formed at least in part from graphite.

Preferred hollow carbon microfibers are carbon fibrils described in U.S. Pat. No. 4,663,230 and Japanese Published Examined Patent Application Nos. 3-64606 and 3-77288, incorporated herein by reference. These microfibers are hollow fibers having an outer diameter (a fiber diameter) of approximately 3.5–70 nm and an aspect ratio of at least 5, and are formed from a graphite material having a crystal structure in which the C axis is substantially perpendicular to the fiber axis.

A particularly preferred hollow carbon microfiber for use in the present invention is that sold under the trademark Graphite Fibrils by Hyperion Catalysis International (USA). This is a graphite-based hollow microfiber having an outer diameter of about 10–20 nm, an inner diameter of at most 5 nm, and a length of 100 to approximately 20,000 nm (0.1 to 20 μm). Preferred hollow carbon microfibers have a volume resistivity (all measurements of volume resistivity were made under a pressure of 100 kg/cm$^2$) of at most 10 Ω·cm.

As mentioned above, the present hollow carbon microfibers are manufactured and available as an intricate secondary agglomeration of microfibers.

According to the present invention, hollow carbon microfibers obtained as such microfiber agglomerations are chemically treated with a particular solution comprising a strong acid containing sulfur in addition to an oxidizing agent. Hollow carbon microfibers are disentangled and homogeneously dispersed in a polar solution.

The strong acids are sulfuric acid and other inorganic or organic acids containing sulfur that are stronger than sulfuric acid. A stronger acid than sulfuric acid is generally called superacid. Some examples of strong acids (superacids) containing sulfur (except sulfuric acid), are oleum, chlorosulfuric acid, fluorosulfuric acid, boric-sulfuric acid and trifluoromethane-sulfonic acid. One or two or more types of these strong acids containing sulfur can be used.

A strong acid containing sulfur (except oleum) can be used in pure form or can be diluted with a solvent. A solvent used in the present invention is generally water, but an ionic strong acid and an oxidizing agent can be dissolved in the present solvent. One or two or more of the organic solvents which do not react with these strong acids and oxidizing agents are also available individually or as a mixture with water.

Some examples of such organic solvents are lower aliphatic carboxylic acid (e.g., acetic acid), sulfonic acid (e.g., benzenesulfonic acid, toluensulfonic acid), halogenated aromatic hydrocarbon (e.g., chlorotoluene), and nitrogenated solvent (e.g., nitromethane, nitrotoluene, nitrobenzene).

The concentration of sulfuric acid in the solvent is 25 weight % or more, preferably 50 weight % or more, and more preferably 90 weight %. In the case of the superacid solvent containing sulfur, the solvent has the preferable acidity corresponding to the concentration of sulfuric acid and can be used in a lower concentration than sulfuric acid. The higher the acidity of a treating solution, the greater the effectiveness of disentangling the agglomeration of hollow carbon microfibers and dispersing them into a polar solution.

As an oxidizing agent, an optional oxidizing agent having acidity in a strong acid containing sulfur can be used, such as nitric acid, fuming nitric acid, nitrate (e.g. potassium nitrate, sodium nitrate, etc.), permanganate (e.g. potassium permanganate, sodium permanganate etc.), chromic acid, chromate, ozene, hydrogen peroxide and lead dioxide. In these oxidizing agents, nitric acid is preferably in the concentration of 30 weight %, or more.

An amount of the oxidizing agent in the strong acid containing sulfur varies with the kind of strong acid and oxidizing agent, but is generally in the range of about 0.001–100 weight % (by the weight ratio of an oxidizing agent to a strong acid containing sulfur on the standard in the content except a solvent). The weight ratio is more preferably 0.1–100 weight %, and the amount of the oxidizing agent is preferably about 0.1 weight % or more and more preferably 0.5 weight %, or more by the weight ratio to the hollow carbon microfibers (oxidizing agent/microfiber).

It is possible to treat the hollow carbon microfibers at a temperature from room temperature to boiling point. The microfibers are treated until they are easily disentangled in a polar solution. The end point in treating the microfibers is judged by measuring the disappearance of nitrous acid (the gaseous products of the reduction of nitric acid). The higher the soaking temperature is, the shorter the soaking time. For example, it takes a few hours to soak the microfibers at soaking temperature of 75° C., but only a few minutes under the temperature of 130° C.

This treatment makes the agglomeration of microfibers disentangle individually and disperse homogeneously in a polar solution. In treating the hollow carbon microfibers with a strong acid containing sulfur in addition to an oxidizing agent, it is conjectured that the surface of carbon microfibers is modified with the catalysis of the strong acid containing sulfur and the oxidation of the oxidizing agent. A polar functional group (such as a carbonyl group, a carboxyl group or a nitro group (in the case of nitric acid or nitrate as an oxidizing agent)) is formed. As the affinity to a polar solvent increases, the microfibers are easily dispersed in a polar solvent. As a result of this treatment, the weight loss of hollow carbon microfibers occur and the oxygen content increases remarkably.

After the wet chemical treatment, hollow carbon microfibers are recovered from the strong acid containing sulfur, filtered to remove the acid on the microfibers by washing. The hollow carbon microfibers are disentangled in a polar solution, and so a solution in which microfibers homogeneously disperse can be obtained. In the present invention, the solution in which the microfibers disperse can be used as a coating composition for the formation of an electrically conductive transparent microfibers aggregation film. By coating the coating composition on some substrates and drying a coating film, an electrically conductive transparent microfibers aggregation film is formed.

Polar solvents such as water, alcohols (such as ethanol, propyl alcohol, isopropyl alcohol, butyl alcohol, etc.), ethers (such as diethyl ether, etc.), ketones (such as methyl ethyl ketone, methyl isobutyl ketone, isophorone, etc.), lower liphatic carboxylic acid (such as acetic acid), polar solvent containing nitrogen (such as N,N,-dimethylformamide, hexamethylformamide, nitromethane, N-methylpyrrolidone, etc.), and dimethyl sulfoxide can be used. The polar solvent can be an individual solvent or a mixed solvent consisting of two or more different solvents. Preferable polar solvent are water, alcohol, or a mixed solvent of water, alcohol or other polar solvents.

To disentangle and disperse the hollow carbon microfibers in a polar solvent, the microfibers are stirred in a polar solvent. Stirring can be accomplished mechanically or by ultrasonic wave treatment. Stirring with milling also can be applied. It is preferable for microfibers to be cut under aspect ratio 5 of microfibers. Hollow carbon fibers, modified by the above-described surface treatment, are easily separated by such stirring. The polar solution thus contains microfibers which are homogeneously dispersed to individual microfibers. The solution containing microfibers can be used as a coating composition for an electrically conductive transparent microfibers aggregation film.

There are no particular limits on the amount of hollow carbon microfibers in the polar solution obtained by the above-described method (namely, a coating composition for an electrically conductive transparent microfibers aggregation film) if electrical conductivity and transparency formed by the present solution are compatible. Preferably, it is about 0.001–5 weight % and particular preferably about 0.01–1 weight %. If the amount is less than 0.001 weight %, the electrical conductivity of a coating film is insufficient, while if the amount is greater than 5 weight %, transparency of a film may be effected.

After a substrate is coated with the present solution and the coating is dried or cured, the polar solvent is vaporized. An electrically conductive transparent carbon microfibers aggregation film on the substrate is formed. A coating solution can be coated by known coating methods, such as spin coating, spraying coating, dipping, bar coating etc. The type of a substrate can be generally transparent materials such as the film or the sheet of glass or transparent plastic (e.g., polyesters, polycarbonate, acrylic resins, etc.) and moreover occasionally untransparent materials suitable for applications.

Hollow carbon microfibers treated with the present method have self-cohesiveness and combine with one another at the contact point between microfibers after drying without using a binder. Therefore, according to the present invention, a perfect carbon transparent aggregation film comprising substantially hollow carbon microfibers alone can be obtained without the addition of a binder.

Figure 2:
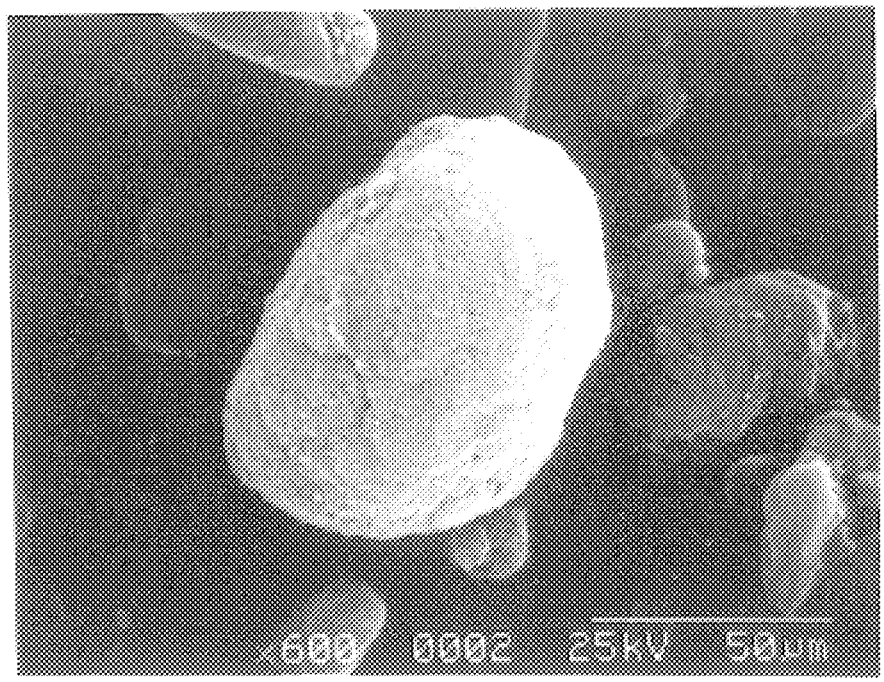
FIG. 2 is a transmission electron microscope (TEM) picture of electrically conductive transparent microfibers aggregation film comprising substantially hollow carbon microfibers without a binder.

TEM (transmission electron microscope) picture of the present electrically conductive transparent microfibers aggregation film comprising substantially hollow carbon microfibers alone without containing the binder is shown in FIG. 2. The film consisting of hollow carbon microfibers dispersed individually is formed according to FIG. 2. The thickness of the present electrically conductive transparent microfibers aggregation film is generally about 0.05–1 $\mu$m, in particular preferably about 0.05–1 $\mu$m.

If the thickness is greater than 1 $\mu$m, transparency of the film is interfered with because of blackening of the film. However, in the uses which do not need transparency (e.g., filters, catalyst carriers, electrodes etc.), there are no particular limits on the thickness of the film and it is possible that the thickness of the film is several of 10 $\mu$m. The thickness of the film can be controlled by the content of microfibers suspended in the solution and the number of coatings.

Further, in order to reinforce a coating film, an organic or an inorganic polymer binder can be added to the solution coating microfibers. A coating composition for electrically conductive transparent film comprising a binder and hollow carbon microfibers in a polar solvent treated with a strong acid containing sulfur in addition to an oxidizing agent can be obtained. If such a coating composition is coated on a substrate with the above-described method and a coating film is dried (occasionally, hardening a binder), an electrically conductive transparent film consisting of a binder and hollow carbon microfibers in a matrix is obtained.

The binder can be any type of an organic binder (all kinds of natural or synthetic polymers or monomers) or an inorganic binder (organo silanes which form silicate or silica by hydrolysis reaction) dissolved or dispersed in a used polar solvent. Preferred binders are anionic binders such as cellulose acetate, or acid polymer containing acid monomer in a part (such as olefinic or acrylic polymer to which acrylic acids copolymerize e.g., acrylic emulsion).

In the case of using a binder, hollow carbon microfibers are present in an amount of at least 0.5 weight % at least by the total weight of a binder (solid content) to impart good electrical conductivity to an obtained film. As mentioned above, there are no particular upper limits on amounts of hollow carbon microfibers in a binder since hollow carbon microfibers form a transparent electrically conductive film alone.

It is preferable to adjust the content of hollow carbon microfibers so as to impart necessary transparency and electrical conductivity corresponding to the thickness of a transparent electrically conductive film. That is to say, in the case of a relatively thin film, even if a film contains large hollow carbon microfibers, transparency of a film is maintained. However, if the thickness is over 1 $\mu$m, a film loses its transparency because hollow carbon microfibers are present in a large amount in a film. In the case of a remarkably thin film, when hollow carbon microfibers in a large amount are used, a film having good electrical conductivity is obtained.

For example, in a remarkably thin film of 0.1 $\mu$m, the film contains at least 10 weight % and more preferably 30 weight %, or more of hollow carbon microfibers. On the other hand, if the thickness of the film is 0.5 $\mu$m or more, in order to have good electrical conductivity, the film should contain a small amount of 0.5 weight % (preferably about 4–10 weight %) of hollow carbon microfibers.

In the case of a transparent electrically conductive film containing a binder, transparency can be maintained even if the thickness increases. Accordingly, the thickness of a transparent electrical conductive film is in the range of about 0.05–5 $\mu$m.

Moreover, a coating composition forming a transparent electrically conductive film which does not contain a binder may contain an additive or a number of additives. The additive can be dispersing agents (a surfactant or a coupling agent), cross-linking agents, stabilizers, anti-settling agents, coloring agents, or charge adjusting agents, etc.

There are no particular limits on the types or amounts of additives in the coating composition. Transparent electrically conductive metal oxide powders in addition to hollow carbon microfibers can be used also.

When the solution in which a binder is dissolved is penetrated into a transparent electrically conductive microfibers aggregation film being formed out of the solution containing microfibers alone, it is possible to increase the strength of the film for the binder fills up the blank spaces between microfibers.

A transparent electrically conductive microfibers aggregation film and a transparent electrically conductive film have a black tone of carbon microfibers, but have transparency and electrical conductivity. Since carbon fibers in the present invention are ultra thin hollow carbon microfibers, both transparency and electrical conductivity are imparted by carbon fibers.

The use of electrically conductive fibers with a larger aspect ratio of fibers and a lower bulk density of fibers results in improved electrical conductivity as the contact point between the electrically conductive fibers (per weight) increases. Because hollow carbon microfibers have an ultra thin diameter, a large aspect ratio, a hollow shape, and a low bulk density, the necessary content of fibers needed to impart electrical conductivity to a film diminishes and the film can be thinner.

On the other hand, as the present hollow carbon microfibers have a hollow outer diameter of less than 0.1 $\mu$m, which is smaller than the shortest wave of visible light, and a hollow shape, visible light is absorbed by electrically conductive fibers and it is easy for a film to transmit visible light. As a result of this characteristic and a thin film, transparency is substantially imparted to a microfibers aggregation film formed out of carbon fibers.

Compared to a transparent electrically conductive film comprising conventional electrical conductive metal oxide powders, a transparent electrically conductive microfibers aggregation film and a transparent electrically conductive film have a black color and a relatively low light transmittance. However, the haze value is higher because both light scattering and reflection do not occur.

The transparent electrically conductive microfibers aggregation film of the present invention which contains a binder has about 60% or more of a total light transmittance and about 0.5% or less of a haze value. The total light transmittance preferably is about 70% or more and more preferably about 85% and the haze value is preferably about 0.1% or less. The surface resistance of the present film is generally in the range of about $10^2$–$10^{10}$ $\Omega/\square$, preferably $10^2$–$10^{10}$ $\Omega/\square$. A film having such transparency and electrical conductivity comprising carbon fibers alone was not in known existence until this invention and was realized first by the present inventors.

In a transparent electrically conductive film containing a binder, the haze value increases a little due to the existence of a binder. Nevertheless, the haze value of the film is about 1.0% or less, preferably about 0.5% or less. The other characteristics are the same as an aggregation film without a inder.

The present invention is further described and illustrated in the following examples. Further objects of this invention, together with additional features contributing thereto and advantages accruing therefrom, will be apparent from the following examples of the invention. It will be appreciated that various modifications in the embodiments described can be made by the skilled person without departing from the spirit or scope of the invention as defined in the appended claims.

The hollow carbon microfibers used in the examples were those sold by Hyperion Catalysis International Inc. under the name Graphite Fibrils BN and CC. Graphite Fibrils BN is a hollow fiber having an outer diameter of 0.015 $\mu$m (15 nm), an inner diameter of 0.005 $\mu$m (5 nm), and a length of 0.1–100 $\mu$m (100–10,000 nm). In bulk, it has a volume resistivity of 0.2 $\Omega\cdot$cm. Graphite Fibrils CC is a hollow fiber having an outer diameter of 0.015 $\mu$m (15 nm), an inner diameter of 0.005 $\mu$m (5 nm), and a length of 0.2–200 $\mu$m (200–20,000 nm). In bulk, it has a volume resistivity of 0.1 $\Omega\cdot$cm.

In the Examples, the surface resistance of the electrically conductive film was measured at a relative humidity of 50% using an insulation resistance meter (Model SM 8210 manufactured by Toa Denpa), and the transparency was measured using a haze meter (a direct reading haze computer manufactured by Suga Test Instruments) as total light transmittance and as haze value. The transparency value is the value subtracted from the value of a substrate.

EXAMPLE I 150 ml of 98 weight % sulfuric acid were added to 7.5 g of Graphite Fibrils BN and furthermore 50 ml of 60 weight % nitric acid were added as an oxidizing agent. After stirring the slurry sufficiently, microfibers were treated for 15 minutes at 120° C. without stirring.

After the treated slurry was cooled to room temperature, microfibers were separated with a filter, were washed sufficiently with water, and 5.3 g of microfibers were gained (yield is about 70%).

The result of elements content by gas analysis in untreated and treated hollow carbon microfibers is shown in the following Table 1. From Table 1, the oxygen content of microfibers increased remarkably and the contents of the other elements increased a little.

TABLE 1

|  | Element (weight %) | | | |
| --- | --- | --- | --- | --- |
|  | N | O | H | S |
| untreated | 0.06 | 2.3 | 0.14 | <0.01 |
| treated | 0.30 | 16.0 | 0.20 | 0.70 |

After adding the treated hollow carbon microfibers to water, the slurry containing these microfibers of 0.5 weight % is gained by means of ultrasonic waves dispersion. The coating composition was applied atop a glass plate by spin coating, the coating film was dried at room temperature, and the thickness of the transparent electrically conductive aggregation film was 0.2 $\mu$m. The surface resistance of the microfibers aggregation film was $6 \times 10^2 \Omega/\square$, the total light transmittance was 95%, and the haze value was 0.1%.

Further, when hollow carbon microfibers were increased from 7.5 g to 10 g in the above-described treatment, the microfibers containing oxygen of 12 weight % is gained in the yield of 80%. On the other hand, when the hollow carbon microfibers were decreased from 7.5 g to 5 g, the microfibers containing oxygen of 20 weight % is gained in the yield of about 60%. Namely, the less the treated microfibers were decreased, the more the oxygen content of the recovered microfibers was increased and the yield decreased (weight loss increased).

Further, when 12.5 g of the hollow carbon microfibers were soaked in a mixed solution of 150 ml of 98 weight % sulfuric acid and 75 ml of 60 weight % nitric acid, the yield was 80%.

Following the above procedure, a transparent electrical aggregation film with a thickness of 0.2 $\mu$m was formed by a coating slurry of the treated microfibers and with nearly the same results of electrical conductivity and transparency as the above film.

EXAMPLE 2

Following the Example 1 procedure, the transparent electrically conductive aggregation film with a thickness of 0.8 $\mu$m was formed. The surface resistance of the microfibers aggregation film was $8 \times 10^3 \Omega/\square$, the total light transmittance was 81%, and the haze value was 0.2%.

EXAMPLE 3

After the slurry containing 0.5 weight % Graphite Fibrils CC treated with the same procedure as Example 1 was gained, this slurry was diluted to 0.1 weight % slurry containing microfibers with ethyl alcohol. This coating composition of 0.1 weight % was applied atop a polyester by a bar coater, the coating film was dried at room temperature, and the thickness of the transparent electrically conductive aggregation film was 0.1 $\mu$m. The surface resistance of the microfibers aggregation film was $9 \times 10^4 \Omega/\square$, the total light transmittance was 97%, and the haze value was less than 0.1%.

EXAMPLE 4

Graphite Fibrils BN treated with the same procedure as Example 1 was dispersed in an acetone solution, in which cellulose acetate (manufactured by Daiseru Kagaku Kougyou) as a binder was dissolved. The slurry, comprising microfibers in an amount of 40 weight % and a binder in an amount of 60 weight % based on a solid content, was prepared by means of ultrasonic waves.

Following the same procedure as Example 3, this coating composition was applied atop a polyester by a bar coater, the coating film was dried at room temperature, and the thickness of the transparent electrically conductive film was 0.1 $\mu$m. The surface resistance of the microfibers aggregation film was $7 \times 10^6 \Omega/\square$, the total light transmittance was 90%, and the haze value was 0.1%.

In the present invention, it is possible to disentangle intricate microfiber agglomerations and to disperse them in a polar solution (to individual microfibers) by means of chemical treatment of the hollow carbon microfibers. The present hollow carbon microfibers can be easily used for various applications as electrically conductive fillers and reinforcing materials and it is possible to form a film in which microfibers homogeneously distribute, or an aggregation layer stacking microfibers.

Further, it is possible to form a perfect carbon transparent aggregation film on a substrate without a binder from the polar solution in which microfibers are homogeneously dispersed in a low concentration. This film, with a blackish color consisting of carbon fibers alone has outstanding transparency and is very useful in various applications such as a film for shielding electromagnetic waves and imparting antistatic properties. Hollow carbon microfibers dispersed by means of the present invention can be used for forming a transparent electrically conductive film with a binder in the same method as conventional carbon fibers.

The electrically conductive transparent carbon microfibers aggregation film (and the electrically transparent film) of the present invention can be used as substrates for display devices, transparent electrodes, and materials for shielding electromagnetic waves. The film is also useful for providing various transparent structures with antistatic properties while maintaining the transparency of the structures. Examples of such transparent structures include electromagnetic wave shields of cathode ray tubes, TV glass, transparent plastic panels for dust-proof interior or exterior partitions or show windows recording materials such as photographic films or optical or magnetic recording devices, and packages for semiconductor chips and electronic elements.

Stacked aggregation layers of hollow carbon microfibers, disentangled by the method of the present invention, are useful for filters, catalyst carriers, electrodes and active materials of electrolysis and batteries.

The hollow carbon microfibers can also be used for electrically conductive materials in keeping them dispersed, such as electrically conductive fillers for insulating polymer, electrically conductive materials for cathodes, anodes, and electrolytes in primary or secondary batteries, and as reinforcing materials. Without interfering with the transparency of products, the hollow carbon microfibers can impart electrical conductivity and mechanical strength to the products.

In addition, these hollow carbon microfibers can be used as the black pigment in the ink of ink-jet printers, the toner of copying machines, and laser-marking. The ultra fine fiber-shape and outstanding dispersibility if these hollow carbon microfibers prevents blockages in the nozzles of such printers and copiers.

The above description of the invention is intended to be illustrative and not limiting. Various changes or modifications in the embodiments described may occur to those skilled in the art. These can be made without departing from the spirit or scope of the invention.

I claim:

1. An electrically conductive transparent carbon microfibers aggregation film comprising hollow carbon microfibers, said microfibers being treated with a strong acid containing sulfur and an oxidizing agent, wherein said carbon microfibers have an outer diameter of 100 nm or less and said film has a total light transmittance of about 60% or more.

2. The electrically conductive transparent carbon microfibers aggregation film according to claim 1 which includes an additive such as a dispersing agent, a cross-linking agent, a stabilizer, an anti-settling agent, a coloring agent, or a charge adjusting agent.

3. An electrically conductive transparent film comprising a binder and hollow carbon microfibers, said microfibers being treated with a strong acid containing sulfur and an oxidizing agent, wherein said carbon microfibers have an outer diameter of 100 nm or less and said film has a total light transmittance of about 60% or more.

4. The electrically conductive transparent film according to claim 3 wherein the binder is selected from the group consisting of organosilanes, cellulose acetate, an olefinic polymer and an acrylic polymer.

5. The electrically conductive transparent film according to claim 3 having surface resistance in the range of about $10^2$–$10^{10}$ $\Omega/\square$.

6. The electrically conductive transparent carbon film according to claim 3 comprising hollow carbon microfibers having a total transmittance of about 60% or more and a haze value of about 0.5% or less.

7. The electrically conductive transparent carbon microfibers aggregation film of claim 1, wherein said carbon microfibers have an outer diameter of about 3.5 to 70 nm.

8. The electrically conductive transparent film of claim 3, wherein said carbon microfibers have an outer diameter of about 3.5 to 70 nm.

9. The electrically conductive transparent carbon microfibers aggregation film of claim 1, wherein said film has a thickness between about 0.05 to 5 microns.

10. The electrically conductive transparent film of claim 1, wherein said film has a total light transmittance of about 70% or more.

11. The electrically conductive transparent film of claim 1, wherein said film has a total light transmittance of about 85% or more.

12. The electrically conductive transparent film of claim 3, wherein said film has a total light transmittance of about 70% or more.

13. The electrically conductive transparent film of claim 3, wherein said film has a total light transmittance of about 85% or more.

14. The electrically conductive transparent film of claim 1, wherein said film has a haze value less than 1%.

15. The electrically conductive transparent film of claim 1, wherein said film has a haze value less than 0.5%.

16. The electrically conductive transparent film of claim 1, wherein said film has a haze value less than 0.1%.

17. A method of making the electrically conductive transparent film of claim 1, comprising the steps of:

(a) treating carbon microfibers with a strong acid containing sulfur and an oxidizing agent to form disentangled carbon microfibers; and (b) forming said film from said disentangled carbon microfibers.

18. The method of claim 17, wherein said disentangled carbon microfibers are washed prior to forming said film.

19. The method of claim 17, wherein said film is formed by spin coating.

20. The method of claim 17, wherein said strong acid is sulfuric acid and said oxidizing agent is nitric acid.

* * * * *